(12) United States Patent
Green

(10) Patent No.: US 11,503,928 B2
(45) Date of Patent: Nov. 22, 2022

(54) PICTURE FRAME WITH WIRELESS CHARGING DEVICE

(71) Applicant: Andrew Bradford Green, Mt. Pleasant, SC (US)

(72) Inventor: Andrew Bradford Green, Mt. Pleasant, SC (US)

( * ) Notice: Subject to any disclaimer, the term of this patent is extended or adjusted under 35 U.S.C. 154(b) by 0 days.

(21) Appl. No.: 17/234,634

(22) Filed: Apr. 19, 2021

(65) Prior Publication Data

US 2021/0289959 A1 Sep. 23, 2021

Related U.S. Application Data

(63) Continuation of application No. 16/517,349, filed on Jul. 19, 2019, now Pat. No. 10,980,363.

(60) Provisional application No. 62/700,364, filed on Jul. 19, 2018.

(51) Int. Cl.
| | |
|---|---|
| A47G 1/14 | (2006.01) |
| A47G 1/06 | (2006.01) |
| H02J 7/02 | (2016.01) |
| H02J 7/00 | (2006.01) |
| H02J 50/10 | (2016.01) |

(52) U.S. Cl.
CPC ............... *A47G 1/142* (2013.01); *A47G 1/06* (2013.01); *H02J 7/0029* (2013.01); *H02J 7/0045* (2013.01); *H02J 7/025* (2013.01); *H02J 7/027* (2013.01); *H02J 50/10* (2016.02); *A47G 2001/0694* (2013.01)

(58) Field of Classification Search
CPC ... A47G 1/142; A47G 1/06; A47G 2001/0694
See application file for complete search history.

(56) References Cited

U.S. PATENT DOCUMENTS

| | | | | |
|---|---|---|---|---|
| 3,789,528 A | * | 2/1974 | Knoell | A47G 1/06 40/792 |
| 2002/0135974 A1 | * | 9/2002 | Bell | G06F 1/1632 361/679.41 |
| 2009/0082835 A1 | * | 3/2009 | Jaax | H02J 7/007192 607/61 |
| 2012/0223573 A1 | * | 9/2012 | Schatz | H02J 7/0029 307/9.1 |
| 2016/0345654 A1 | * | 12/2016 | Beers | H02J 7/025 |
| 2017/0150773 A1 | * | 6/2017 | Beers | A43B 1/0054 |
| 2019/0231098 A1 | * | 8/2019 | Fang | F16M 13/02 |

\* cited by examiner

*Primary Examiner* — Gary C Hoge
(74) *Attorney, Agent, or Firm* — Wayne Edward Ramage; Baker Donelson

(57) ABSTRACT

A stand for use with a charging device, such as, but not limited to, a Qi Wireless Charger. The stand is in the form of a picture frame, and elevates the charging unit up off a desk or tabletop, at an angle where a device being charged can be placed thereupon. A portion of the back of the frame is removably secured, and provides a space for securely holding the wireless charging device therein. The charging device power cord is routed through a picture frame support extending from the back of the frame.

9 Claims, 10 Drawing Sheets

PICTURE FRAME WITH WIRELESS CHARGING DEVICE

This application is a continuation of U.S. patent application Ser. No. 16/517,349, filed Jul. 19, 2019, which claims priority to U.S. Provisional Application No. 62/700,364, filed Jul. 19, 2019, by Andrew Green, both of which are incorporated herein in their entireties by specific references for all purposes.

FIELD OF INVENTION

This invention relates to a picture frame for use with a recharging device, including but not limited to the Qi Wireless Charger.

SUMMARY OF INVENTION

In various exemplary embodiments, the present invention comprises a stand for a picture stand for use with a charging device, such as, but not limited to, a Qi Wireless Charger. The frame elevates the charging unit up off a desk or tabletop, at an angle where a device being charged can be placed thereupon (i.e., on the glass covering the picture in the front of the frame).

In several embodiments, the invention comprises a picture frame with a front and back, with a portion of the back being removably secured, and a glass or transparent cover for a picture inserted into the frame. The removable section of the back comprises a space for securely holding the wireless charging device therein, with a hole, channel, opening or slot in the bottom for routing of the charging device cord (e.g., USB cord or power cord).

In several embodiments, a frame support may extend from the back for holding the picture frame in an upright position. The power cord may pass through the frame support (i.e., the stand is hollow in whole or in part) or through a slot, channel, opening, or hole that extends for some or all of the length of the frame support.

In additional embodiments, a plurality of slots, holes or vents may be provided in the back near the charging device, thereby promoting cooling ventilation to the charging device. The bottom side of the frame (and frame support) may comprise a rubber, plastic, silicone or similar covering in whole or in part, or feet made of the same material or materials.

The holding space comprises a shape configured to securely hold the corresponding charging device when inserted in the holder (but allows the charger to be easily removed for travel). In some embodiments, for example, the holder is oval in form to match the shape of a Qi Wireless Charger. The holder may be open in both front and back, or may be partially or completely enclosed in back. A rubber (or similar material) band or coating may extending wholly or partially around the interior of the holder opening to securely hold the charging device in place.

DETAILED DESCRIPTION OF EXEMPLARY EMBODIMENTS

Figure 1:
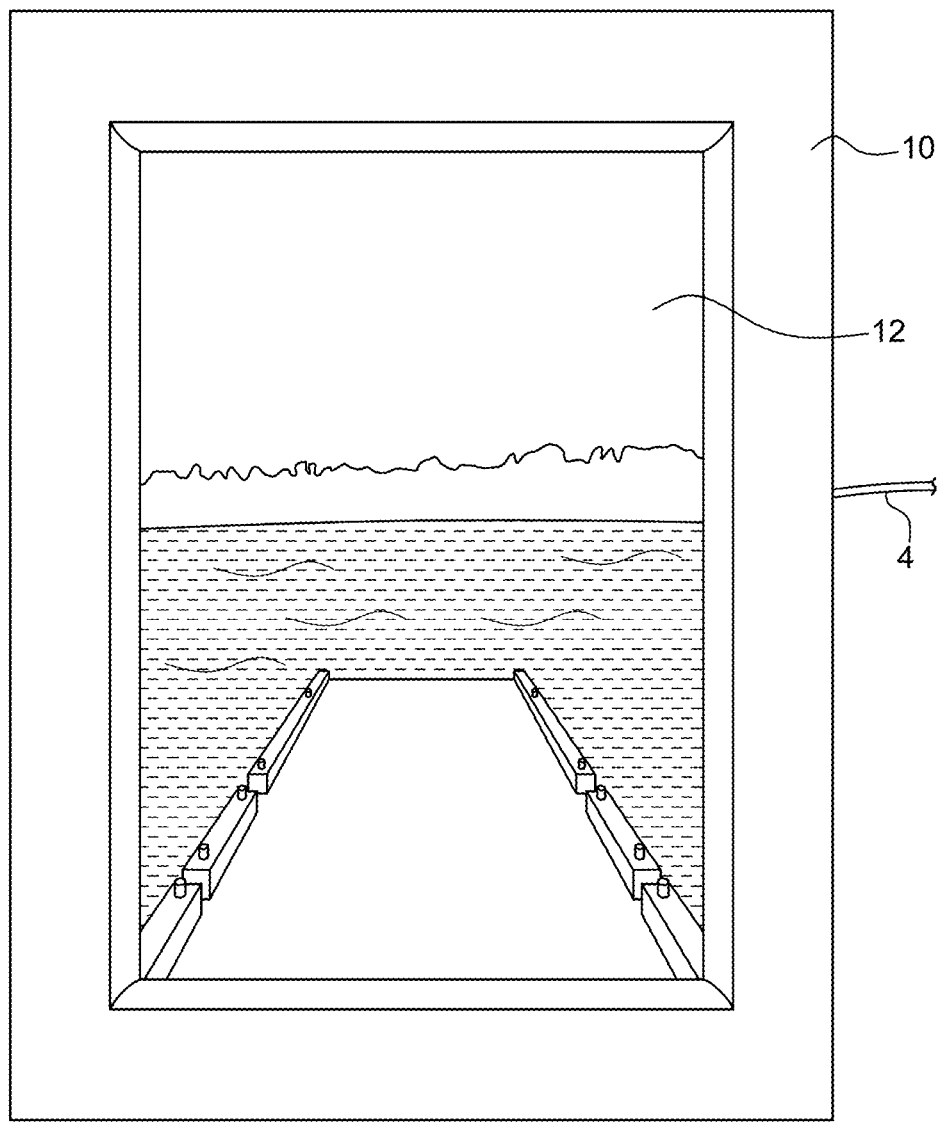
FIG. 1 shows a front view of a frame with a charging device in accordance with an embodiment of the present invention.
Figure 2:
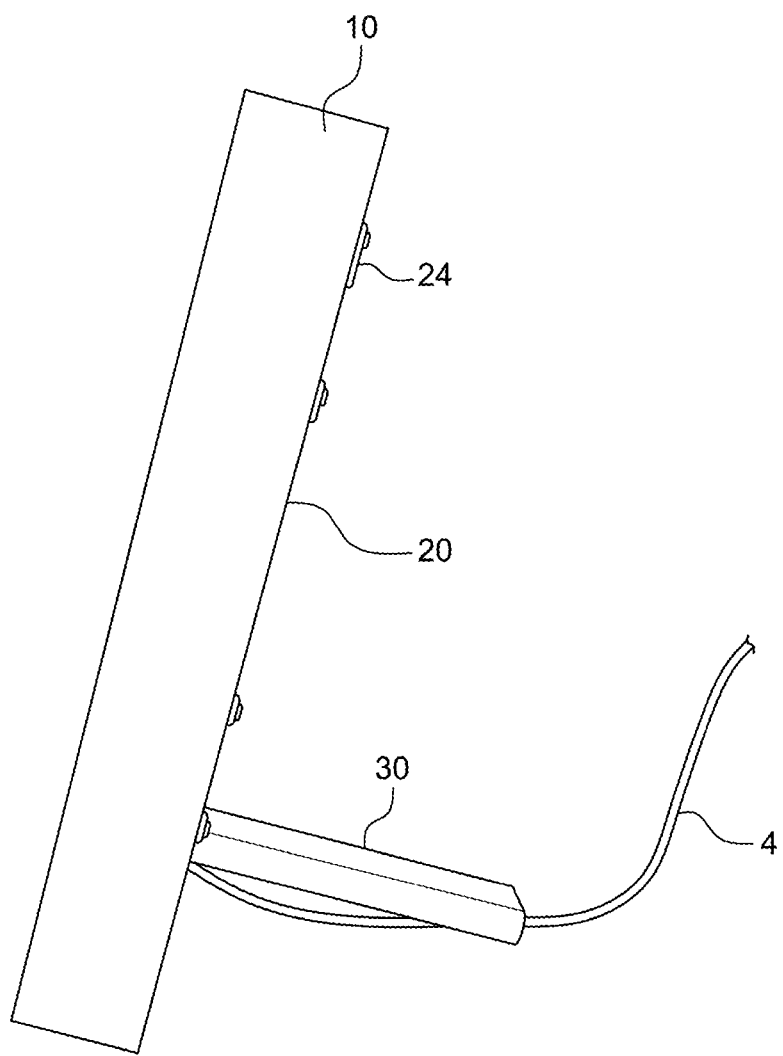
FIGS. 2-6 shows views of the frame of FIG. 1.
Figure 3:
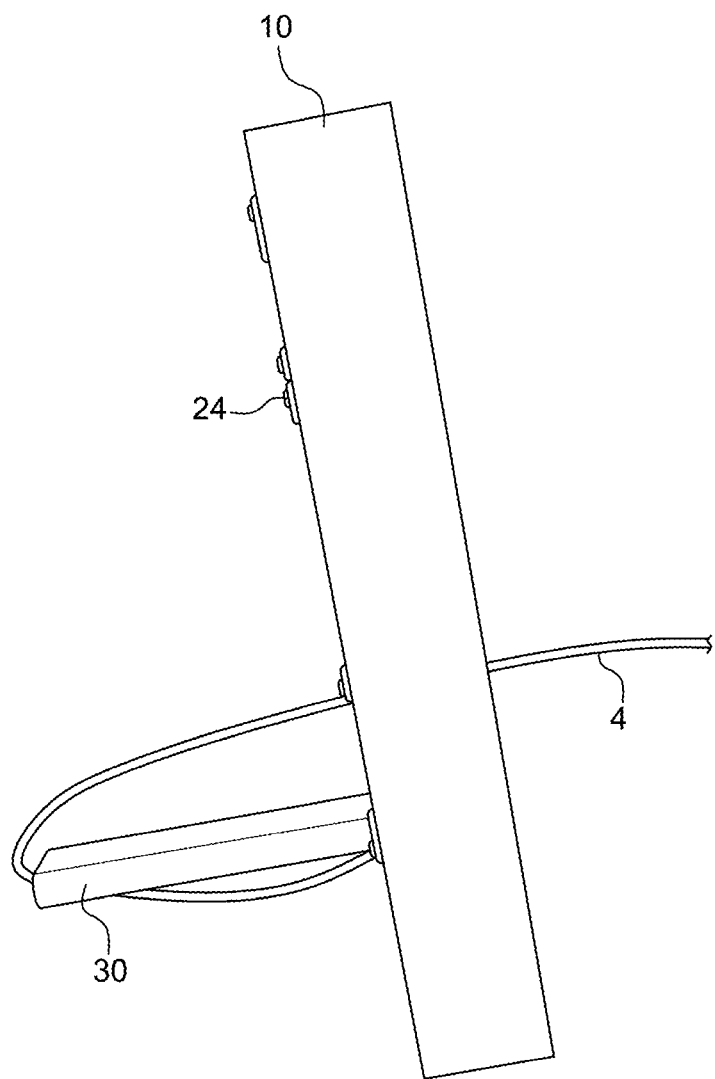
Figure 4:
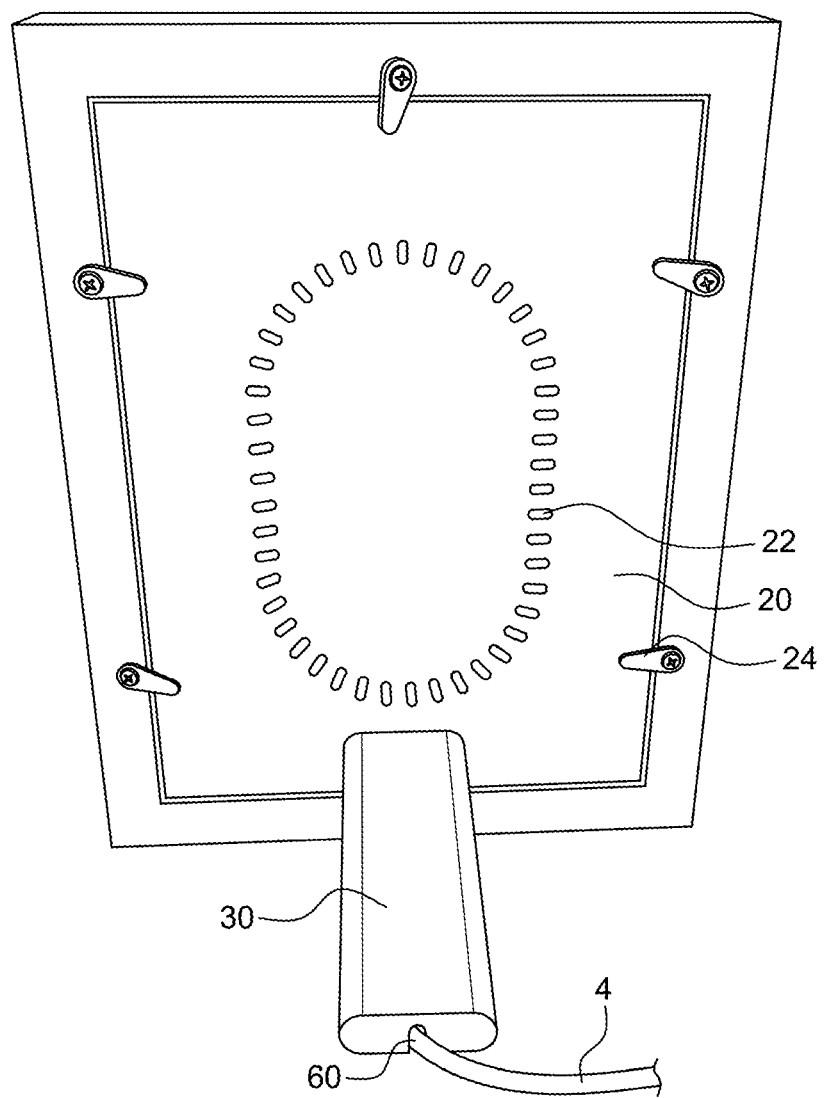
Figure 5:
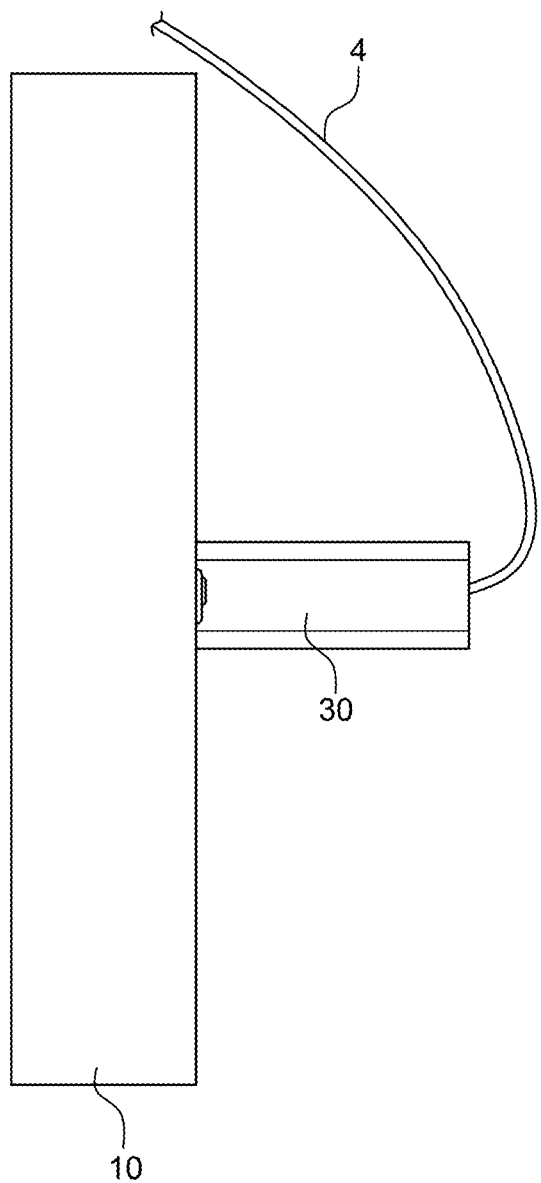
Figure 6:
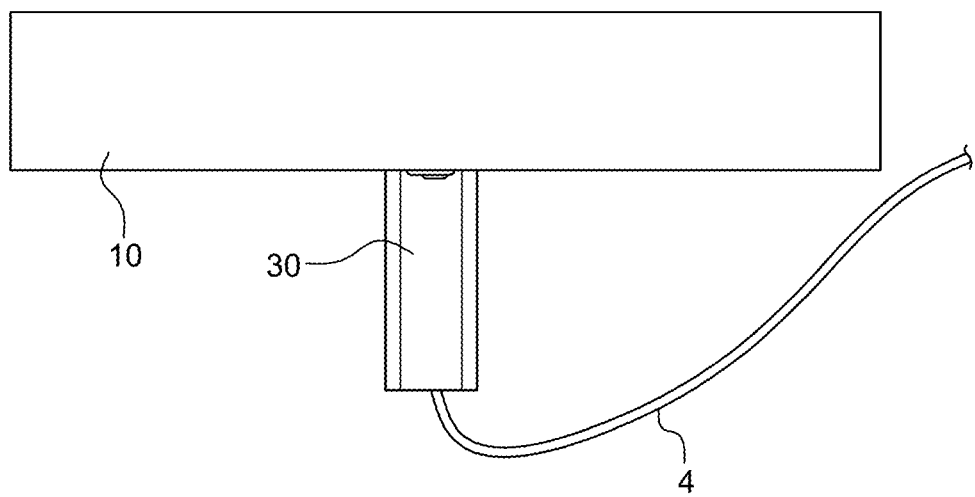

In one exemplary embodiment, as seen in FIGS. 1-9, the present invention comprises a stand for use with a charging device 2, such as, but not limited to, a Qi Wireless Charger. The stand elevates the charging unit up off a desk or table top, at an angle where a device being charged 6 can be placed thereupon (i.e, on the glass covering the picture in the front of the frame).

In the embodiment shown, the invention comprises a picture frame 2 with a front and back, with a portion of the back 20 being removably secured, and with a portion of the front comprising a glass or transparent cover 12 for a picture inserted into the frame. The removable section of the back 20 comprises a space for securely holding the wireless charging device therein, with a hole, channel, opening or slot 62 in the bottom for routing of the charging device cord 30 (e.g., USB cord or power cord).

The picture frame 10 may be made of any material known in the art for making picture frames, including, but not limited to, wood, metal, paper, stone, or the like. The frame may be constructed so the glass or transparent cover 12 is relatively flush with the front of the frame, or recessed therefrom. The frame may be of any size suitable to hold a photograph or pictures, such as, but not limited to, a 5"×7" photo. The back may be secured by various means known in the art for picture frames, such as rotatable support tabs 24.

In several embodiments, a frame support 30 may extend from the back for holding the picture frame 10 in an upright position. The power cord 4 may pass through the frame support 30 (i.e., the stand may be hollow in whole or in part) or through a slot, channel, opening or hole 60 that extends for some or all of the length of the frame support. The bottom side of the frame (and frame support) may comprise a rubber, plastic, silicone or similar covering in whole or in part, or feet made of the same material or materials.

In additional embodiments, a plurality of slots, holes or vents 22 may be provided in the back near the charging device, thereby promoting or providing cooling ventilation to the charging device. A status light or indicator 26 (such as an LED light) on the back or front of the frame may be provided to alert the user when the device is charged, finished charging, or is unable to charge for some reason (such as a foreign object being detected). The status light or indicator may change color, or may blink or be static to indicate various states.

Figure 7:
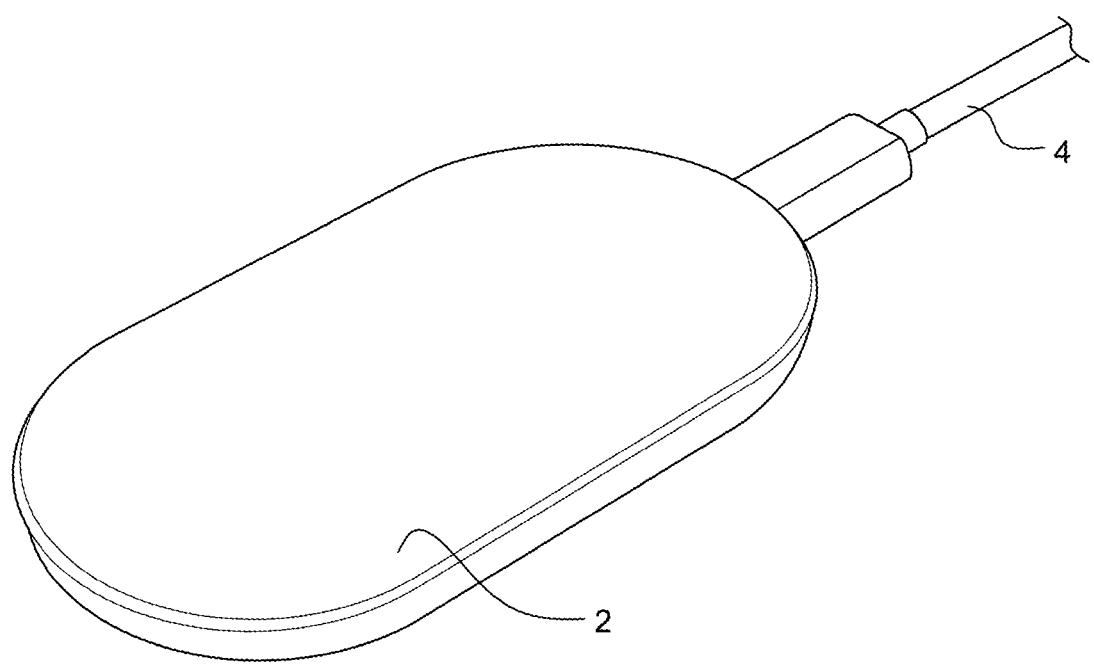
FIG. 7 shows an example of a charging device.

In some embodiments, the charging device is embedded in the back of the picture frame. In other embodiments, the charging device may be removably secured in a holding space or area 40. The holding space may comprise a shape configured to securely hold the corresponding charging device when inserted in the holder (but allows the charger to be easily removed for travel). In some embodiments, for example, the holder is oval in form to match the shape of a Qi Wireless Charger, as seen in FIG. 7. The holder may be open in its front and/or back, or may be partially or completely enclosed in back. A rubber (or similar material) band, liner, or coating may extend wholly or partially around the interior of the holder opening to securely hold the charging device in place.

Figure 8:
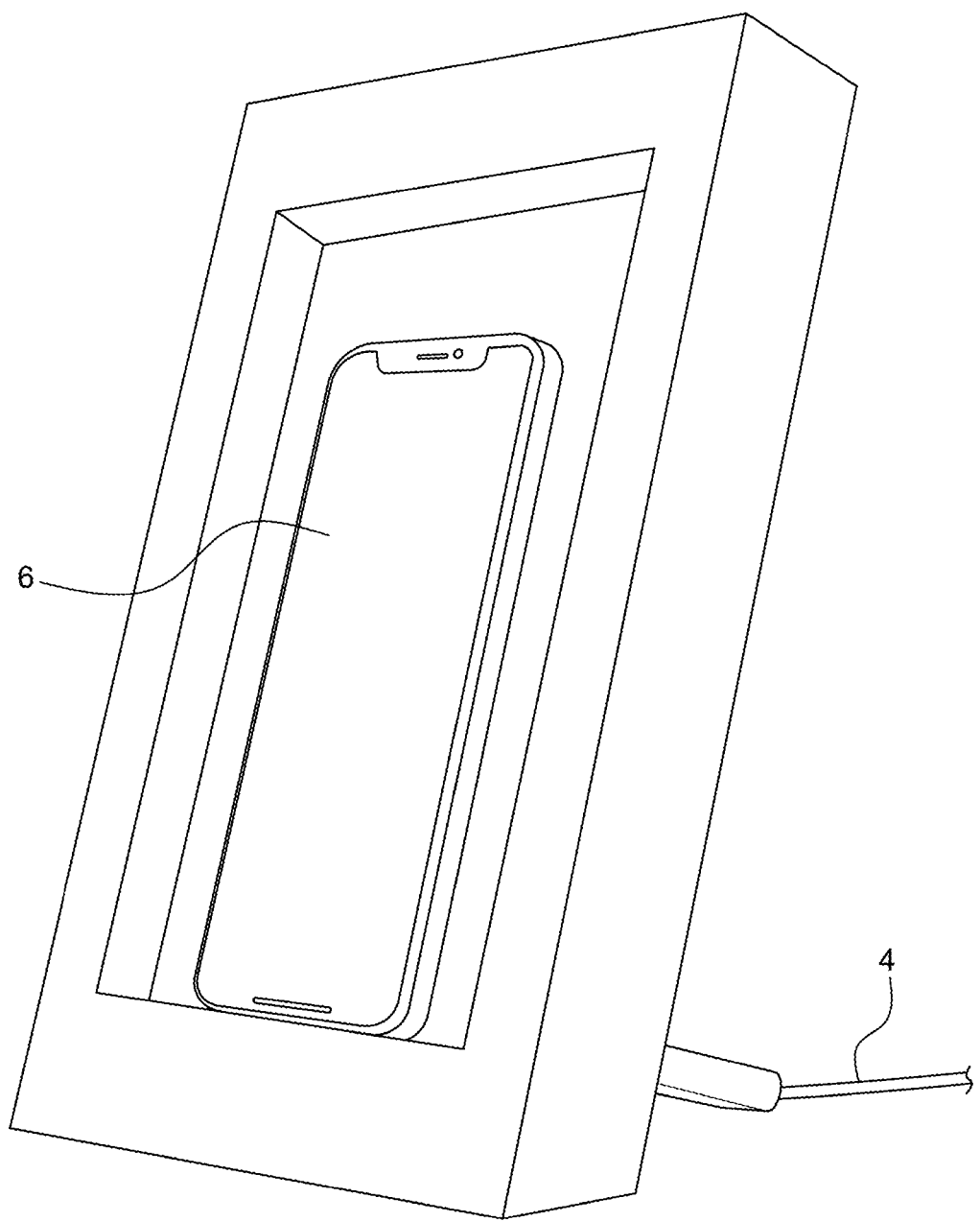
FIG. 8 shows an example of the frame of the present invention with a mobile device being charged.
Figure 9:
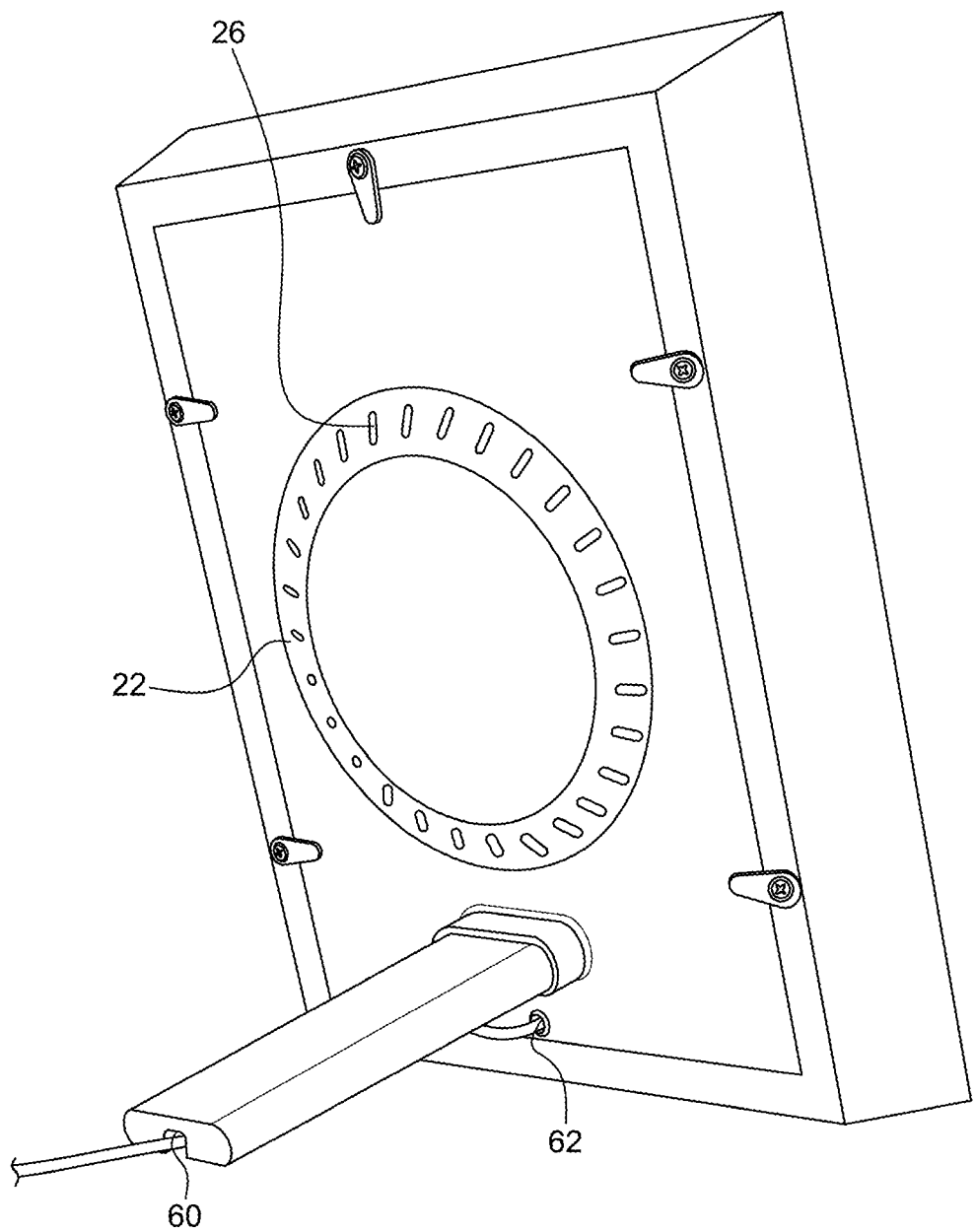
FIG. 9 shows a view of a back of a frame of the present invention with ventilation holes and a status light.
Figure 10:
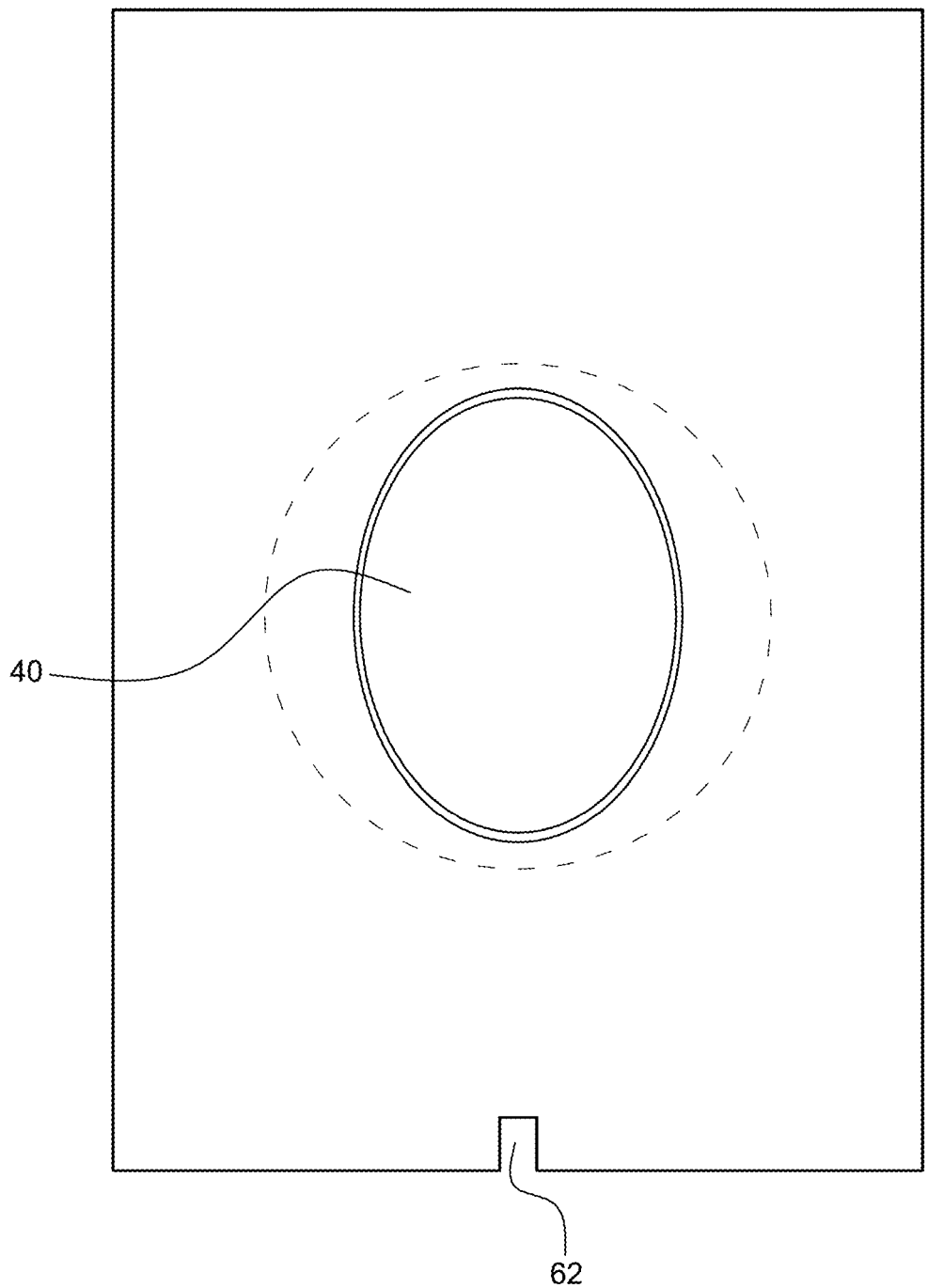
FIG. 10 shows an exemplary interior view of a back of a frame with a charging device holder.

In some embodiments, a small lip or holder may extend from the front of the bottom of the frame to provide a resting point or holder for the bottom of the device being charged, when leaned against the front of the picture. Alternatively, as shown in FIG. 8, the device being charged 6 may rest on the top edge of the bottom part of the frame itself.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A holding stand for a recharging device, comprising:
    a picture frame with a front side and back side, the back side being coextensive in area with the front side and being removable in whole or in part; and
    a charging device disposed in the picture frame between the front side and back side.

2. The holding stand of claim 1, further comprising:
    a transparent picture cover configured to fit within the front side of the picture frame.

3. The holding stand of claim 2, wherein the picture frame is rectilinear in form, with a top element, bottom element, and two side elements, and the transparent picture cover is recessed from the front of the picture frame.

4. The holding stand of claim 3, wherein the front of the picture frame is configured to hold a device being charged on the bottom element while leaning against the transparent picture cover.

5. The holding stand of claim 1, the back side further comprising one or more ventilation holes or openings.

6. The holding stand of claim 1, the back side further comprising a charging status indicator.

7. The holding stand of claim 6, wherein the charging status indicator is a light.

8. The holding stand of claim 1, further comprising a picture frame support.

9. The holding stand of claim 8, wherein the picture frame support comprises a channel or opening configured to receive a power supply cord for the charging device.

* * * * *